United States Patent [19]
Knoll

[11] Patent Number: 5,176,540
[45] Date of Patent: Jan. 5, 1993

[54] DISTRIBUTOR STRIP FOR TELECOMMUNICATION SYSTEMS FOR CONNECTING INCOMING AND OUTGOING LINES

[75] Inventor: Rudolf Knoll, Berg, Fed. Rep. of Germany

[73] Assignee: Siemens Aktiengesellschaft, Munich, Fed. Rep. of Germany

[21] Appl. No.: 768,158

[22] Filed: Sep. 30, 1991

[30] Foreign Application Priority Data
Sep. 28, 1990 [DE] Fed. Rep. of Germany ....... 9013646

[51] Int. Cl.⁵ .............................................. H01R 9/22
[52] U.S. Cl. .................................... 439/709; 439/715
[58] Field of Search ................................ 439/709–712, 439/713, 715, 716, 718, 717, 719, 723, 724, 395, 402, 403

[56] References Cited
U.S. PATENT DOCUMENTS

| | | | |
|---|---|---|---|
| 3,777,223 | 12/1973 | Chandler et al. | 439/719 X |
| 4,611,879 | 9/1986 | Bullard | 439/715 X |
| 4,846,735 | 7/1989 | Teichler et al. | 439/719 X |
| 5,033,981 | 7/1991 | Scholtholt et al. | 439/709 X |

FOREIGN PATENT DOCUMENTS
0403864 12/1990 European Pat. Off. .

Primary Examiner—Neil Abrams
Assistant Examiner—Khiem Nguyen
Attorney, Agent, or Firm—Hill, Van Santen, Steadman & Simpson

[57] ABSTRACT

A distributor strip is composed of an underpart housing and of a contact part housing mechanically joined thereto. The contact part housing contains the contact parts of the contacts belonging to the line leads in corresponding receptacle chambers. The mechanical joining of the housing parts occurs with the assistance of a plurality of cache elements arranged in a row. Guide elements that engage at the cooperating shape-matched to one another upon joining at present at the end-face limiting wall surface. An accurate guidance of the contact part housing to be introduced and, therefore, a secured position of this housing relative to the cache elements are therefore effected when the two housing parts are joined, for example given the utilization of what are referred to as channel and spring elements. This pre-centering also secures the adhesion of the two housing parts, particularly when such cache elements are present exclusively at one elongate side.

4 Claims, 2 Drawing Sheets

DISTRIBUTOR STRIP FOR TELECOMMUNICATION SYSTEMS FOR CONNECTING INCOMING AND OUTGOING LINES

BACKGROUND OF THE INVENTION

1. Field of the Invention

The present invention relates to a distributor strip for connecting line leads in telecommunication systems, particularly in a private branch exchange (PBX), being joined of an upper part housing and a contact part housing mechanically joined thereto and wherein the switching and/or separating contacts composed of separate contact parts are introduced in corresponding chambers in at least one row-like arrangement.

2. Description of the Prior Art

For solder-free connection of electrical line leads, the contact parts thereof contained in such a distributor strip are provided with knife-edge terminals. The contact parts can be introduced such that their knife-edge contacts extend in the same direction. However, it can also be provided that these knife-edge contacts, generally known as insulation-piercing or insulation-disrupting contacts are provided for jumpering lines and lie at the front side of the strip and the knife-edge contacts of the system side, whose occupation usually has to be very seldom changed are arranged at the rear side of the strip. For reasons of a cost-effective manufacturing of the distributor strip, a division thereof into at least two separate housing parts is undertaken, these being then joined to form the distributor strip that is to be accommodated in a mounting rack or, respectively, to be secured to a carrier part.

SUMMARY OF THE INVENTION

It is therefore the object of the present invention to simplify the joining of the aforementioned housing parts. This is achieved in that, given a mechanical connection occurring with the assistance of a plurality of cache or latch elements arranged at at least one row in a longitudinal direction, that engage with cooperating elements provided at the other housing part and, when the contact housing parts are joined, the underpart housing comprises end-face limiting wall surfaces that extend perpendicular to the longitudinal direction at a distance corresponding to the length of the contact part housing, guide elements that are connected of one piece to the limiting wall surfaces and that extend in joining direction are provided. The cooperating form respectively matched to these guide elements is provided at the end-face limiting wall surfaces of the contact part housing itself. The guide element respectively brought into engagement with the cooperating form effects a secured position of the contact part housing relative to the catch elements given the displacement motion of the two housing parts relative to one another that is undertaken for the purpose of joining.

As a result of the guide elements that enable a pre-centering in a simple manner, a positionally-correct, secure engagement of the latch elements is enabled when assembling the distributor strip since an accurate alignment of the contact part housing necessarily exist upon joining. An accurate positional fixing is simultaneously undertaken by the guide elements after the joining of the two housing parts. Such as additional function is particularly advantageous given utilization of catch elements arranged at one side. This single-row arrangement of the cache elements allows the distributor strip to be fashioned particularly narrow. The securing of the correct position of the housing parts relative to one another in the assembled condition ready for use as well is also advantageous given the emplacement of a test adapter since the test pins thereof must exactly contact the contact parts.

An embodiment that is particularly suitable for the pre-centering in accordance with the present invention is comprised therein in an improvement of the present invention that ribs extending perpendicular to the bottom surface of the underpart housing are provided at the inside at those limiting wall surfaces of the underpart housing aligned perpendicular to the longitudinal direction. A cooperating form, an incision adapted to these ribs is present at the limiting wall surface of the contact part housing to be attached at the limiting wall surface of the contact part housing to be attached that respectively faces toward the underpart housing. The strip assembly is therefore possible without problems with this positional securing that is generally referred to as channel and spring guide, particularly given cache elements arranged at one side.

A particularly stable position of the underpart housing to be attached is achieved in accordance with a feature and development of the invention in that the rib present at the limiting wall surfaces lying opposite one another and, in the same manner, the position of the cooperating forms adapted thereto are arranged in mutually-offset planes.

BRIEF DESCRIPTION OF THE DRAWINGS

Other objects, features and advantages of the invention, its organization, construction and operation will be best understood from the following detailed description, taken in conjuction with the accompanying drawings, on which.

DESCRIPTION OF THE PREFERRED EMBODIMENTS

Figure 1:
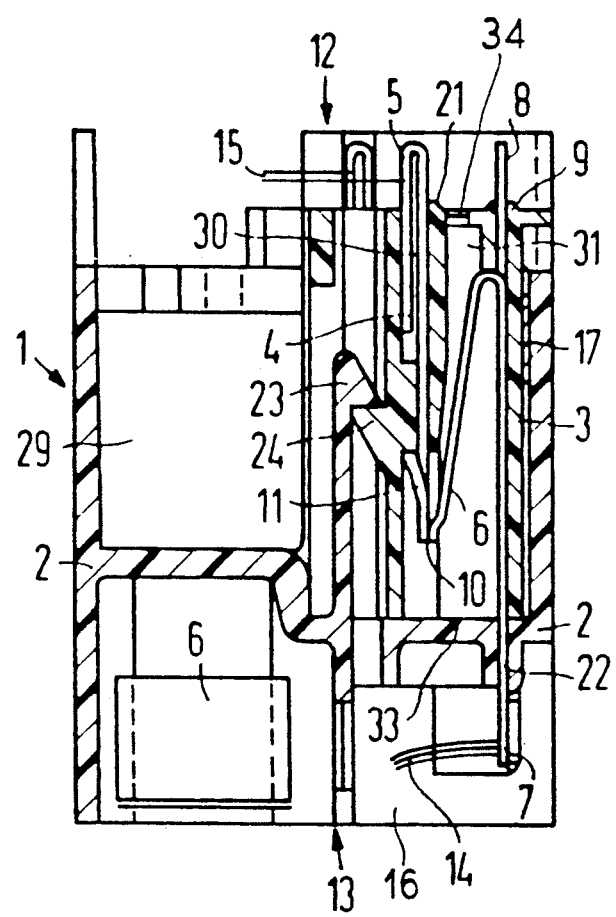
FIG. 1 is a sectional view taken generally along the parting line A—A of FIG. 2 particularly illustrating the contacts.
Figure 3:
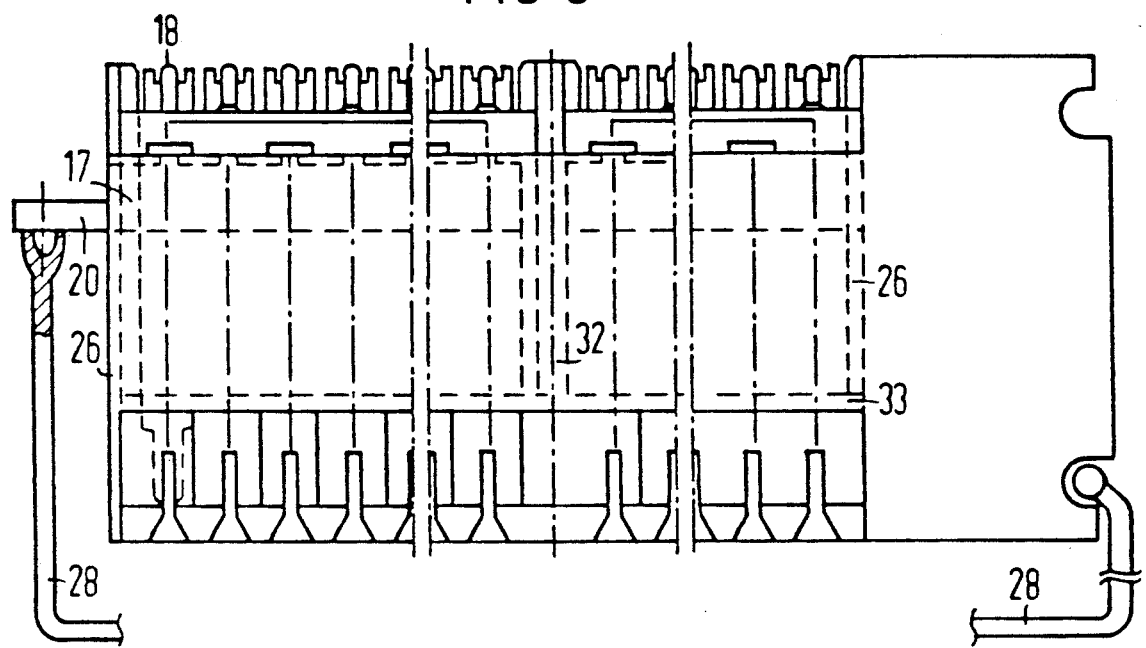
FIG. 3 is a side view of the distributor strip of FIG. 2.

Referring to FIG. 1, a distributor strip 1 is generally illustrated as comprising a contact part housing 3 that contains the housing parts 4 and 6 in a multiple arrangement and is composed of an underpart housing 2. A plurality of such distributor strips, for example, can be mechanically joined to a corresponding carrier part having their elongate sides following one another. The carrier part 28 is indicated in FIG. 3. The contact parts 4 and 6 are introduced into corresponding receptacle chambers 30 or, respectively, 31 of the contact part housing 3 and are held therein in a known manner with, for example, a bent-off interlock tab. For example, a resiliently-spread catch tab 11 that engages behind a shoulder of the underpart housing is present for the contact part 4 that essentially extends on a straight line to the rear side 13 of the distributor strip.

A plurality of such contact parts assigned to one another in pairs is provided, whereby two rows of contact parts 4, 6 respectively assigned to one another are formed in the exemplary embodiment. The two rows are arranged offset vis-a-vis one another. The contact part 4 of the contact pair has a terminal element 5 constructed as a knife-edge post, commonly known as an insulation-opening contact or an insulation-disrupting contact, that projects through a corresponding opening 21 at the front side 12 of the distributor strip. The lines connected to these terminal elements 5 at this servicing side are jumper wires that, for example, lead to the subscribers. These terminals, therefore, are easily accessible for wiring changes after the assembly of the plug connector strips. The contact part 6 comprises a terminal element 7 that is likewise constructed as a knife-edge terminal in the same manner as the terminal element 5. This terminal element 7 extends downwardly out of the contact part housing 3 via an opening 22. For example, the system-side lines 14 incoming from cables are brought to these terminal elements 7 located at the rear side of the distributor strip. For example, these lines can be fixed with the shown pressure member (strain relief) 16. The space 29 formed by the two housing parts after they are joined accepts, for examples, jumper wires.

Figure 2:
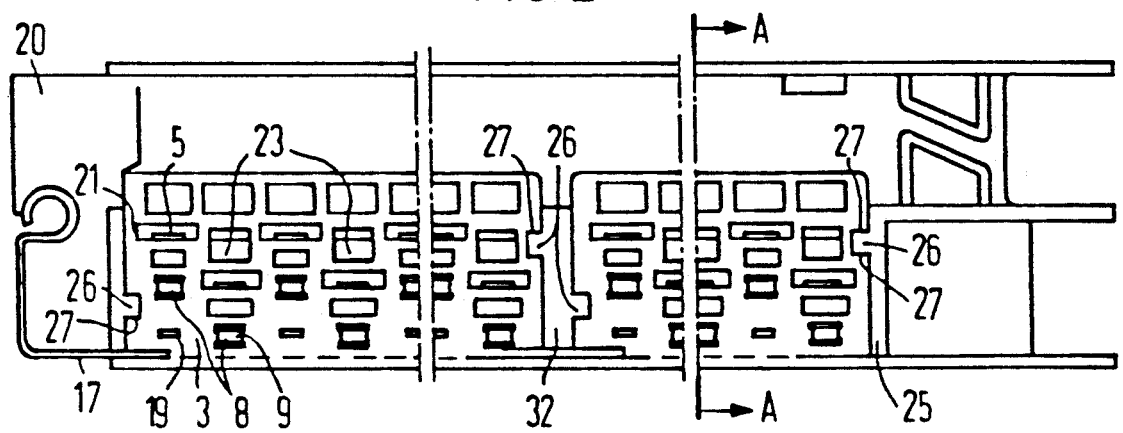
FIG. 2 is a reduced plan view of the distributor strip of FIG. 1.

The contact part 6 comprises a pin-shaped projection 8 that, so to speak has a knife-edge contact structure and passes through an opening 9 so that it is accessible from the servicing side 12. A connection to a component put in place thereon can therefore be produced with a corresponding, pluggable cooperating contact. The free ends of the contact parts 4 and 6 are provided with contact poles 10. This separating contact structure which is therefore formed in the respectively parted by parting tool introduced via a corresponding passage opening, such as at 34. Further pin-like projections 18 (FIG. 3) that represent parts of a grounding plate 17 can pass through openings 19 (FIG. 2). The grounding plane 17, for example, can press against a shoulder 25 and a connection to ground potential can be undertaken by screwing the same to the correspondingly-fashioned end region of the carrier part 28.

In the exemplary embodiment, the terminal elements of the contact parts are fashioned as knife-edge posts and extend upwardly or, respectively, downwardly out of the contact part housing 3. Fundamentally, these terminal elements could also be conducted out of the contact part housing in only one direction, for example at the upper side of the contact part housing.

A contact between the respective terminal element and a lead wire 15 or, respectively, 14 brought thereto is achieved without additional contacting measures merely by impressing the line lead with the assistance of an installation tool.

Each distributor strip 1 is formed by the mechanical joining of the underpart housing 2 to the contact part housing 3 that contains the contact parts 4, 6. This mechanical joining occurs with catch hooks 23 in combination with guide elements 26, 27. These guide elements are provided at those end-face wall parts 25 or, respectively, at the partition 32 of the underpart housing 2 that are aligned perpendicular to the longitudinal direction of the distributor strip and perpendicular to the bottom plate. The spacing of these wall surfaces from one another corresponds to the length dimension of the underpart housing. In the exemplary embodiment, two contact part housings are introduced, in particular, into one underpart housing. In order to enable this, the partition 32 is present at an appropriate distance from the outwardly-disposed wall parts 25.

As may be particularly seen from FIG. 2, the guide elements in the exemplary embodiment are composed of ribs present at the inside of each of the mentioned walls. The ribs 26 engage into the corresponding cut outs 27 when the two housing parts are joined. The cut outs 27 are located at the one end face of the contact part housing 2 that respectively faces toward the mentioned wall parts. As may be particularly seen from FIG. 3, these guide ribs 26 extend down to the bottom plate 33 of the underpart housing 2. In the intermediate region of the bottom plate, the guide rib 26 comprises nearly the exact dimensioned referred to the cut out, whereas what is referred to as a formed-out bevel is provided for the upper region. The joining of the two housing parts is thereby facilitated since the contact part housing 3 having the cut outs 27 present thereat can be brought up to these guide ribs without problems and inserted thereinto after being put in place. The actual connection between the two housing parts 2, 3 is effected by the resilient catch hook 23 present at the inside and extending from the bottom surface 33 of the underpart housing 2. In the longitudinal direction of the upper part housing, these catch hooks are respectively multiply provided at a defined distance from one another, as may be seen from FIG. 2. When the contact part housing 2 is slipped on, this being facilitated by the pre-centering effected with the assistance of the guide elements 26, 27, generally referred to as channel and spring, the resilient catch noses of the catch hooks 23 are press laterally away by the run-on bevel provided at the cooperating element 24. After the contact part housing has been ultimately put in place on the bottom surface 33, these catch noses engage behind the projections 24 of the contact part housing 3 provided as cooperating elements for the catch noses. This latched connection with the assistance of the catch hooks can be undertaken without problems as a result of the directional fixing during the sliding motion. In addition to the pre-centering achieved with these guide elements, an additional retaining function is simultaneously met. This is particularly of significance because the catch hooks are provided at only one elongate side, namely at the inside. In addition to the construction and arrangement of the contact parts, this one-sided arrangement of the catch hooks contributes to the fact that the distributor strip can be fashioned particularly narrow. This means that many more strips can be mounted next to one another.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A distributor strip for connecting line leads in communication systems, particularly in private branch exchanges, said distributor strip comprising:

an upper housing part and a lower housing part which are mechanically joined together, said distributor strip comprising first and second pluralities of mutually-aligned chambers each including a first chamber and a second chamber and an open zone therebetween communicating said first and second chambers;

a plurality of contacts each located in a respective chamber and each including a portion extending into the open zone between aligned chambers to contact and be separable from one another;

said upper housing part comprising a plurality of aligned first catch elements each including an upwardly-facing shoulder and a upwardly-directed oblique ramp surface;

said lower housing part comprising a plurality of aligned resilient second catch elements, each aligned with a respective first catch element and including an oblique surface for engaging the oblique ramp surface of the corresponding first catch element and deflecting against the same as said upper housing part is joined with said lower housing part and including a lower facing surface for engaging the upwardly-facing shoulder of said first catch element;

said upper housing part comprising a first predetermined length and said lower housing part comprising a second predetermined length which is at least a multiple of said first predetermined length so that a plurality of said upper housing parts may be joined to said lower housing part;

said lower housing part comprising a plurality of guide ribs extending upwardly perpendicular to the longitudinal direction of said lower housing part and spaced apart corresponding to the length of said upper housing parts; and said upper housing part comprising a plurality of guide slots to receive said guide ribs of said lower housing part.

2. The distributor strip of claim 1, wherein:

said second catch elements of said lower housing part comprise catch hooks for resiliently contacting and engaging behind said upwardly directed shoulders of said first catch elements as they pass said upwardly-facing shoulders.

3. The distributor strip of claim 1, wherein:

said first guide slots comprise recesses in the distal ends of said upper housing parts and said guide comprise ribs are received in said recesses.

4. The distributor strip of claim 3, wherein:

said ribs and said recesses are provided laterally offset from one another with respect to adjacent upper housing parts.

* * * * *